United States Patent [19]

Bugler, III: Thomas W. et al.

[11] Patent Number: 5,283,012

[45] Date of Patent: Feb. 1, 1994

[54] SELF-BALANCING HOT WATER DISTRIBUTION SYSTEM FOR MULTI-LEVEL COOLING TOWER

[75] Inventors: Bugler, III: Thomas W., Mission, Kans.; Jack D. Bliven, Kansas City, Mo.

[73] Assignee: The Marley Cooling Tower Company, Mission, Kans.

[21] Appl. No.: 30,850

[22] Filed: Mar. 15, 1993

[51] Int. Cl.⁵ .............................................. B01F 3/04
[52] U.S. Cl. ................................. 261/23.1; 261/112.1; 261/112.2; 261/DIG. 11; 261/DIG. 75
[58] Field of Search .................... 261/23.1, 110, 111, 261/112.1, 112.2, DIG. 11, DIG. 75

[56] References Cited

U.S. PATENT DOCUMENTS

| | | | |
|---|---|---|---|
| 3,767,177 | 10/1973 | Engalitcheff et al. | 261/DIG. 11 X |
| 4,801,410 | 1/1989 | Kinney et al. | 261/112.2 |
| 4,826,636 | 5/1989 | Kinney et al. | 261/23.1 |

*Primary Examiner*—Charles Hart
*Attorney, Agent, or Firm*—Hovey, Williams, Timmons & Collins

[57] ABSTRACT

A multi-level film fill industrial size water cooling tower is disclosed having upper and lower film fill packs arranged one above the other, and wherein a self-balancing hot water distribution system is provided for directing flows of hot water from the main supply line to respective distributors which are proportional to flow of hot water in the main supply line. Laterally extending distribution pipes connected to the main supply line in overlying relationship to the film fill packs have restrictor nozzles thereon all located in a common horizontal plane, so that the flow of hot water from all of the nozzles remains proportional to the flow in the main supply line. Each of the restrictor nozzles is vented to the surrounding atmosphere to prevent creation of significant negative pressure on the hot water flowing from each nozzle.

20 Claims, 3 Drawing Sheets

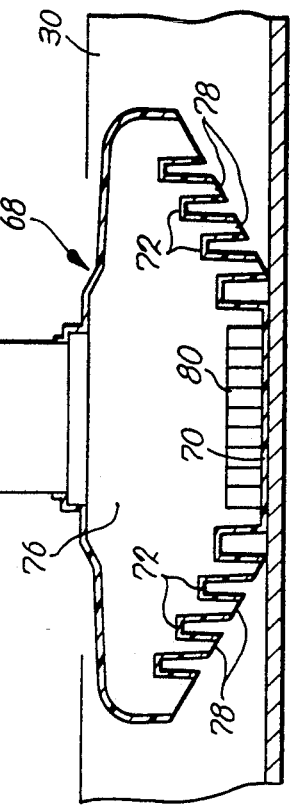
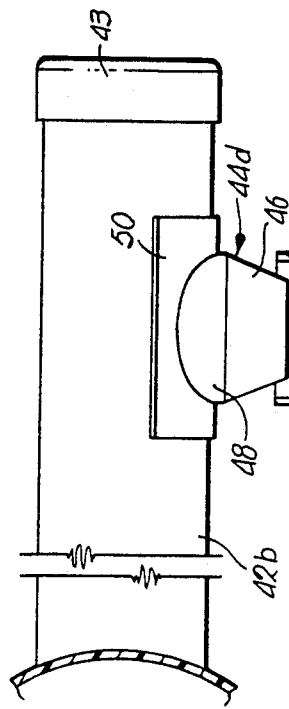
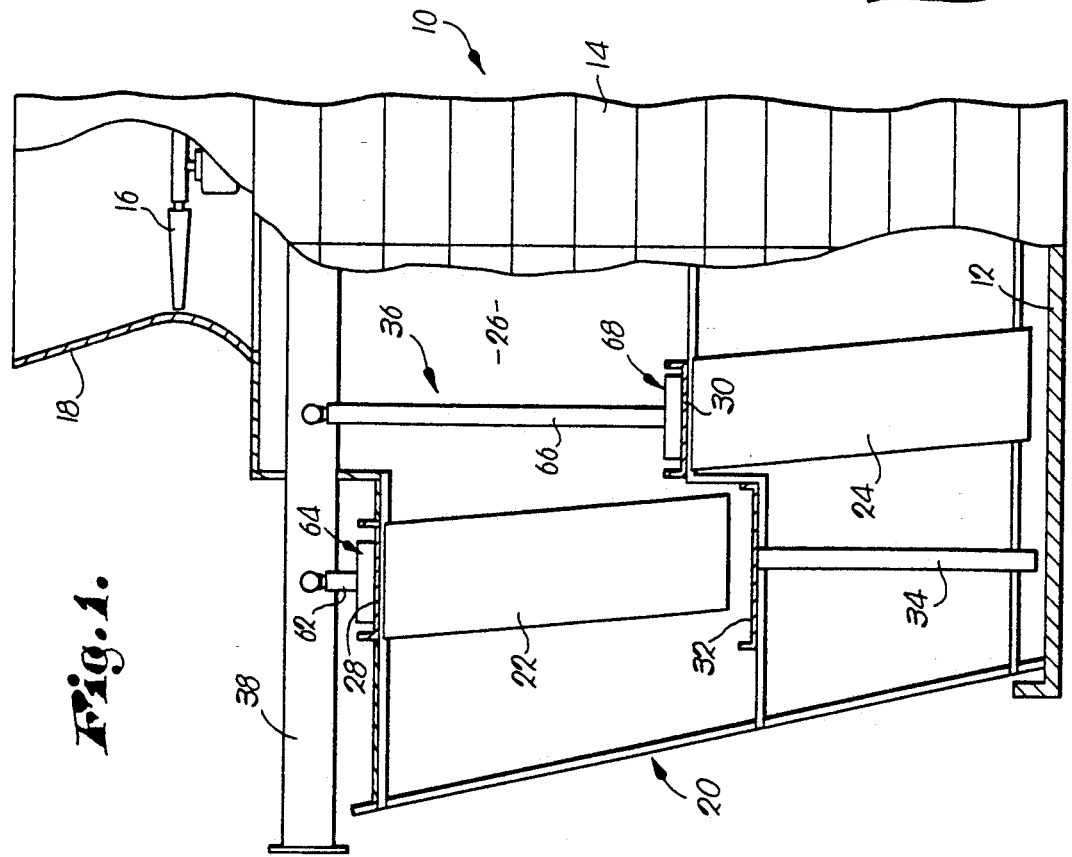

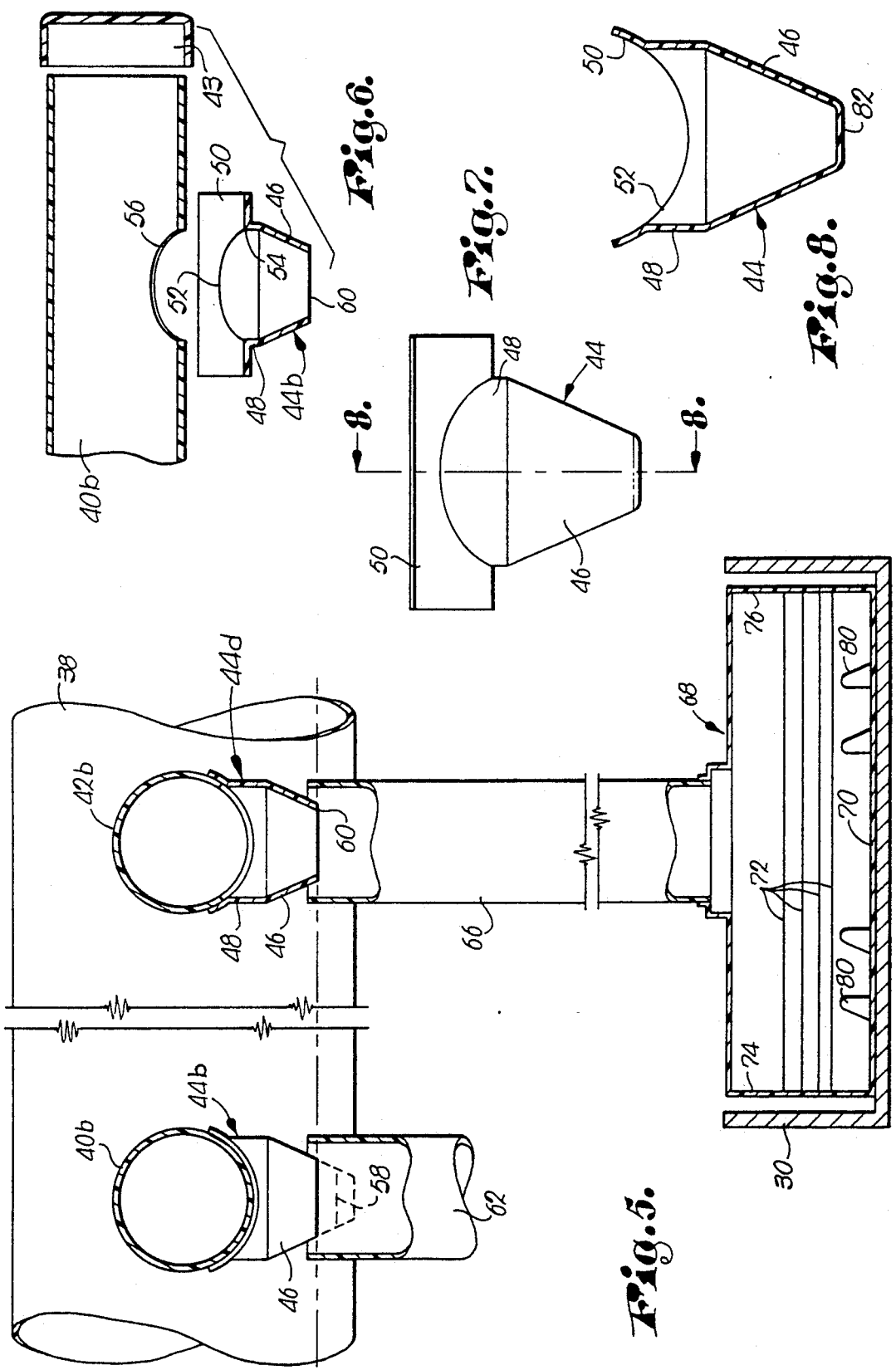

SELF-BALANCING HOT WATER DISTRIBUTION SYSTEM FOR MULTI-LEVEL COOLING TOWER

BACKGROUND OF THE INVENTION

1. Field of the Invention

This invention relates to industrial size, multi-level water cooling towers of the type having upper and lower film fill packs arranged one above the other, and wherein a self-balancing hot water distribution system is provided for delivering water from a main supply line to hot water distributors overlying the upper and lower fill packs respectively for directing hot water across the top of each of the packs.

2. Description of the Prior Art

U.S. Pat. No. 4,826,636, assigned to the assignee hereof, illustrates and describes a multi-level film fill industrial cross flow cooling tower having a series of film fill packs arranged in vertically spaced and horizontally offset relationship. The hot water distribution system of the tower in the '636 patent includes a hot water distribution basin overlying the uppermost fill pack for delivering hot water over the top of that pack, and piping leading from the main supply line to a hot water distribution basin directly over the next lower fill pack.

In instances where more than three vertically spaced fill packs are employed, each fill pack below the uppermost fill has piping means for delivering hot water from the main supply line into a distribution basin directly over respective lower fill packs.

Although this system embodied advantageous features over then existing cooling tower art, and particularly as replacement structure for splash type fill structure, the hot water distribution system did not provide for differences in the flow of hot water through the main supply line. Although not detailed in the '636 patent, those skilled in the art understand that appropriate valve means could be provided for selectively controlling the flow of hot water into the distributors overlying respective fill packs, to compensate for variations in the flow of hot water through the main supply line.

However, manually operating such valves in a manner to obtain an even flow of hot water to each of the distributors overlying the multi-level film fill packs is a time consuming and sometimes difficult task, particularly when it is recognized that industrial size towers of the type shown and described in the '636 patent generally have at least two or three cells and may have as many as twelve or more cells. Thus, these towers are tens of feet high and may be hundreds of feet long. Personnel would therefore be required to adjust and readjust the valves until a required flow into each distributor was obtained. This would mean walking up and down the length of the tower a number of times, or provision of a large crew using radio communications. Even then, difficulties would be encountered in obtaining a balanced water flow into the various distributors overlying respective film fill packs, with valve changes being required each time there was a variation in the flow of hot water through the main supply line.

SUMMARY OF THE INVENTION

In accordance with this invention, a multi-level film fill water cooling tower is provided having upper and lower film fill packs arranged one above the other, and wherein a self-balancing hot water distribution system is included which serves to supply hot water to distributors overlying each of the fill packs at a flow which remains proportional to the flow of hot water through the supply line.

Specifically, the multi-level film fill water cooling tower has flow restrictors for each of the fill pack distributors which impose enough back pressure on the hot water delivered therethrough to assure flow of hot water from all restrictors at a rate which varies in direct proportion to the flow of hot water through the main supply line to the tower. In addition, each of the restrictors is vented to the atmosphere so that no significant negative pressure is created on the hot water flowing from a corresponding restrictor.

Flows of ho water from the main supply line through corresponding distributors overlying the upper and lower film fill packs remains balanced even upon variation of the flow of hot water through the main supply line by virtue of the fact that the restrictors are all positioned at elevations such that horizontal planes through each restrictor discharge orifice is no more than about 2 feet vertically from one another. In the preferred cooling tower structure, the restrictors are all located such that the hot water discharge orifices thereof are essentially positioned in a common horizontal plane.

In a preferred embodiment of the invention, each of the restrictors comprises a conical shaped nozzle presenting a discharge orifice, and having a hot water inlet opening located above the discharge orifice in disposition for connection to the hot water supply line. By virtue of the conical shape of the sidewall of each nozzles, the sidewalls may be cut off at any desired point along the length thereof to present a discharge orifice of desired diameter. In this manner, a one-size restrictor may be manufactured which has application at many different flows, depending upon the point at which the conical side of the sidewall of the restrictor is severed to present the discharge orifice of the restrictor.

An especially important object of the invention is the fact that the flow of hot water to the distributors from the main supply line remains balanced even though the flow of hot water through the main supply line may vary, without the need for expensive valves, valve control mechanisms and remotely located readout devices operationally connected to the individual flow control valves. As a result, manufacturing, installation, operational and maintenance costs are substantially decreased as compared with other competitive towers.

BRIEF DESCRIPTION OF THE DRAWINGS

FIG. 1 is a fragmentary side elevational view of an industrial size, mechanical draft water cooling tower with parts broken away and in section to depict a multi-level film fill pack tower of the type where upper and lower film fill packs are vertically spaced and horizontally offset in the direction of incoming air;

FIG. 4 is an enlarged, fragmentary vertical cross-sectional view illustrating a lateral tube connected to the main supply line, a restrictor nozzle connected and communicating with the lateral tube, a downcomer pipe underlying the restrictor and connected to a splash box positioned within a lower distributor which overlies the lower film fill pack.

FIG. 5 is a fragmentary, vertical cross-sectional view taken on a line at a right angle to the depiction of FIG. 4 and showing the restrictors and associated structure for the upper and lower distributors respectively;

FIG. 6 is a fragmentary, enlarged, exploded, vertical cross-sectional view which illustrates the outer end portion of one of the lateral hot water supply tubes connected to the main supply line, and a nozzle adapted to be affixed to the underside of the lateral tube;

FIG. 7 is a side elevational view of one of the flow restrictors of this invention and illustrating the configuration thereof which permits severing of the conical sidewall at a selected point along the length thereof to define a hot water discharge orifice of desired preselected diameter; and FIG. 8 is a vertical cross-sectional view taken substantially on line 8—8 on FIG. 7 and looking in the direction of the arrows.

DETAILED DESCRIPTION OF THE PREFERRED EMBODIMENT OF THE INVENTION

Figure 2:
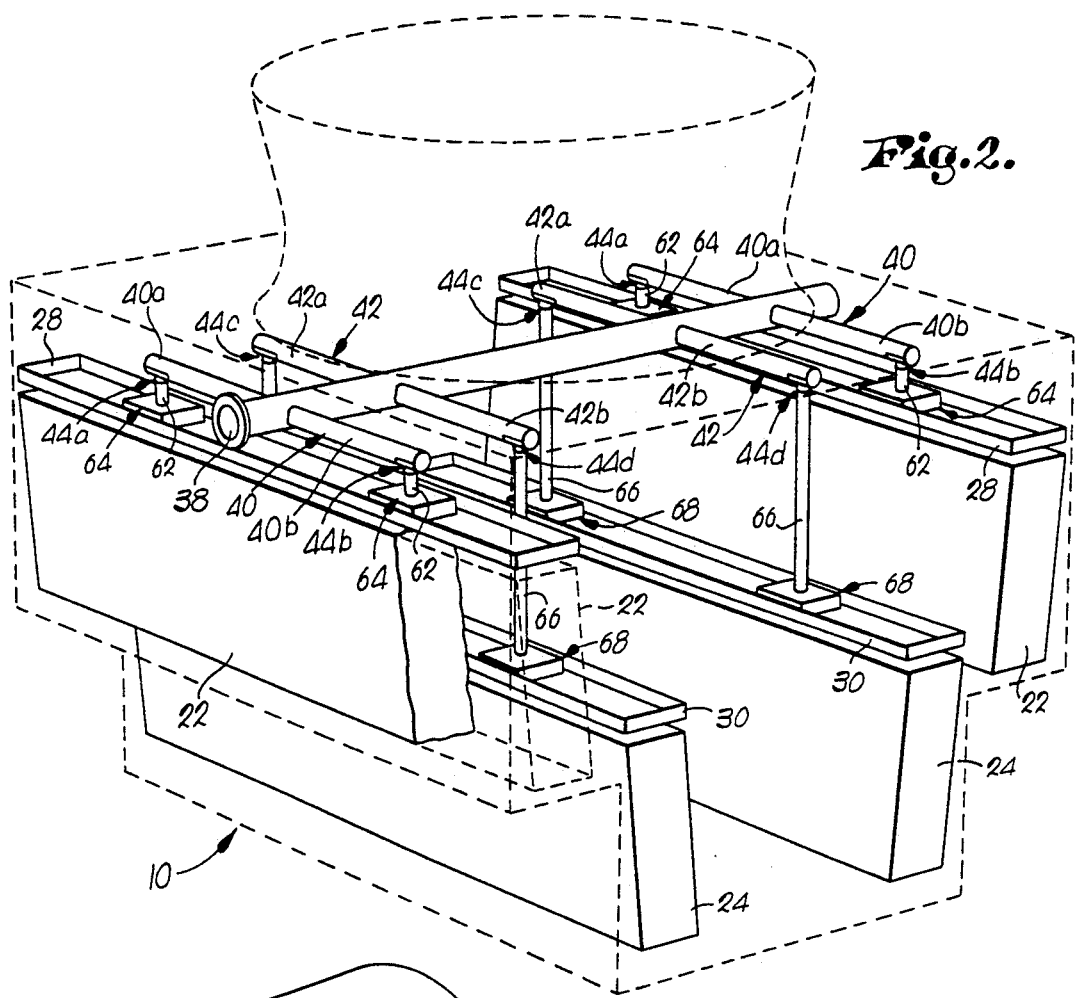
FIG. 2 is an essentially diagrammatic respective view of the self-balancing water distribution system of the present invention which is connected to the horizontal main hot water supply line and services the upper and lower fill packs on opposite sides of the tower.
Figure 3:
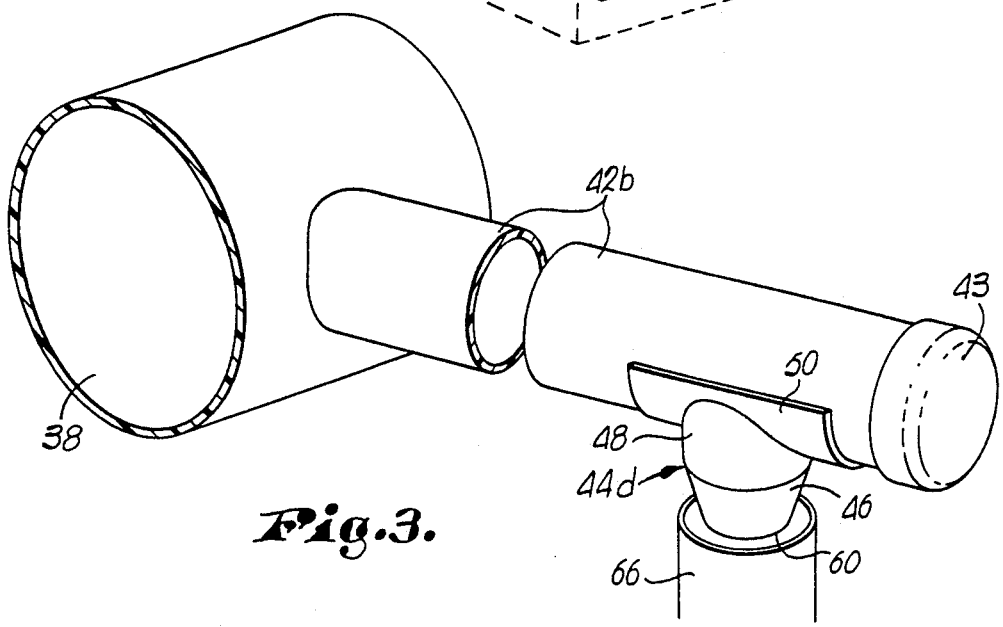
FIG. 3 is an enlarged, fragmentary respective view showing a part of the main supply line, a lateral tube extending from the supply line, a restrictor connected to the lateral tube, and a hot water delivery pipe located below the restrictor in a position to receive hot water for delivering hot water to an underlying fill pack distributor.

Referring first to FIG. 1 of the drawings, the industrial sized water cooling tower fragmentarily depicted in that Figure and broadly designated 10, is of the mechanical draft, cross-flow type, although it is to be appreciated that the present invention is useful in various types of water cooling towers. Tower 10 has a cold water basin 12 within casing 14 which supports a motor driven fan 16 rotatable about a vertical axis within fan cylinder 18. The cooling tower 10 as depicted is of the double flow type wherein air enters through opposed air inlets 20 on opposites of the tower casing 14, as is most evident from the essentially schematic depiction of FIG. 2.

In the embodiment of the invention shown in FIG. 1, two film fill packs 22 and 24 are illustrated, although it is to be understood that the present invention is equally useful for towers that have a greater number of vertically spaced fill packs across each air inlet opening 20 thereof. For purposes of simplicity, only two fill packs 22 and 24 are illustrated, but it is to be understood that similar upper and lower fill packs are provided on the opposite side of tower 10 across the opposed air inlet 20 (not illustrated). Each upper fill pack 22 and each lower fill pack 24 may be made up of any of a number of film fill sheets employed in industrial size cooling towers, and that are configured to maximize surface area for water to be cooled, without causing an undue air pressure drop through the fill pack. An especially useful film fill sheet is the assignee's fill sheet identified as the M-75, and which is essentially shown and described in the assignee's U.S. Pat. No. 4,801,410, incorporated herein by reference thereto.

Viewing FIG. 1, it is to be observed that the upper fill pack 22 and the lower fill pack 24 are at different elevations relatively, and are horizontally offset with the lower film fill pack located inboard of the upper fill pack 22. The lower film fill pack 24 is stepped back toward to the internal plenum chamber 26 of tower casing 14, in order to permit incorporation of film fills of greater height in a tower of a given pump head, and to simplify the hydraulic components for supplying hot water to the fills. For example, if the fills were aligned, even though inclined to compensate for water pull back, it would be necessary to run the hot water downcomer to the lower film fill through the upper fill if it was positioned directly under the lower face of the upper fill. Likewise, the cold water downcomer from the cold water collection basin for the upper fill would have to be routed through the lower fill assembly. This hydraulic arrangement would have the undesirable effect of significantly decreasing the cooling capacity of both the upper and the lower film fills and lowering the efficiency of the tower.

It is also to be appreciated in this respect that the portion of the tower 10 illustrated in FIG. 1 constitutes only one cell il of what is usually a multi-cell tower made up of a number of side by side cells.

An elongated, essentially horizontal distributor 28 directly overlies the upper face of upper fill pack 22, while a similar horizontal distributor 30 is located above the upper face of the lower fill pack 24. Secondary cold water basin 32 directly underlies the lower face of upper film fill pack 22, and has at least one elongated pipe 34 which extends downwardly therefrom to cold water basin 12. In this manner, water that collects in secondary basin 32 is returned to basin 12 in a manner that prevents such water from either being directly pulled into the adjacent face of lower fill pack 24, or impeding air flow into the latter. The bottom face of lower fill pack 24 terminates immediately above cold water basin 12 as is apparent from FIG. 1.

It is to be understood in this respect that the hot water distributors 28 and 30 extend the full cross-wise extent of each upper fill pack 22, and each lower fill pack 24. Although not specifically depicted, each distributor 28 and 30 has means in the bottom thereof for allowing water to flow therethrough onto the upper face of the film fill pack immediately therebelow. This may take the form of a number of openings in the floor of each distributor 28 and 30, with nozzles of predetermined orifice size, controlling the flow of hot water onto the upper face of each of the film fill 22 and 24.

The self-balancing hot water distribution system 36 of this invention is adapted to be connected directly to the essentially horizontal main hot water supply line 38 which is coupled to the source of hot water and extends across the top of the distributors 28 immediately below the fan deck as is shown in FIG. 1. It is to be appreciated in this respect that generally, there will be at least one main hot water supply line 38 for each cell of the tower, with the supply lines 38 being in generally parallel relationship, and connected to a manifold line extending along the length of the tower 10.

As is evident from FIG. 2, which schematically depicts one cell of tower 10 (with the fan stack and casing of the cell being shown by dash lines), the main hot water supply line 38 serving that cell of the tower is located substantially intermediate the sides of casing 14. Supply line 38 is usually of relatively large diameter (for example, at least about 18 to 36 inches). Lateral hot water distribution tubes 40 and 42 are joined to main supply line 38, with oppositely extending tubes 40a and 40b being positioned over each hot water distributor 28, while oppositely projecting tubes 42a and 42b coupled to main hot water supply line 38 are above the distributors 30 as indicated in FIGS. 1 and 2. End caps 43 close the outer most extremities of distribution tubes 40 and 42.

A hot water flow restrictor broadly designated 44 is connected to the outer end portion of each of the tubes 40a, 40b, 42a and 42b. FIGS. 6, 7 and 8, show a restrictor 44 that may be mounted on each of the tubes 40a, 40b, 42a and 42b. It can be seen from these Figures that each restrictor 44 has conical wall structure 46 joined to and integral with substantially cylindrical wall structure 48 connected to a semi-cylindrical saddle 50 of a shape to complementally engage the outer surface of a distribution tube 40 or 42. As best shown in FIG. 6, each saddle 50 has an opening 52 therein aligned with a similarly sized opening 54 at the upper end of the cylindrical wall structure 48. In like manner, each of the distribution tubes 40a, 40b, 42a and 42b have an opening 56 of the same diameter as openings 52 and 54.

In use, the conical wall structure 46 of each restrictor 44 is adapted to be cut along a transverse line 58 selected by the installer to present a hot water discharge orifice 60. As is apparent from FIG. 5, the transverse line 58 along which the conical wall structure 46 is severed, is selected by the installer to provide an orifice 60 of predetermined diameter depending upon the liquid flow from the restrictor 44 desired for a particular job. The restrictors 44, after having been cut along a selected line 58, and thereafter mounted on respective distribution tubes 40 and 42, present downwardly facing hot water discharge nozzles.

As is apparent from FIG. 2, the nozzle defining restrictors 44a and 44b associated with distribution tubes 40a and 40b on opposite sides of the cell 11, are aligned with upright pipes 62 which extend downwardly from the restrictor nozzles 44a and 44b, and are joined to corresponding splash boxes 64 within distributor 28. It can be seen from FIG. 5 that the pipe 62 extending downwardly from each of the restrictor nozzles 44a and 44b are of a diameter such that the opening thereof is of greater area than that of the orifice 60 defined by conical sidewall structures 46. In this manner, air may freely enter the pipe 62 in surrounding relationship to each of the nozzle restrictors 44a and 44b.

Referring to FIGS. 2, 4 and 5, it is also to be seen that restrictor nozzles 44c are connected to each of the outwardly projecting distribution tubes 42a, while a similar restrictor nozzle 44d is coupled to each of the distribution tubes 42b. Restrictor nozzles 44c and 44d project downwardly from respective distribution tubes 42a and 42b and direct overlying relationship to the lower distributors 30.

Elongated pipes 66, aligned with each of the restrictor nozzles 44c and 44d, extend downwardly therefrom and are joined to corresponding splash boxes 68 within distributors 30 and of the same configuration as splash boxes 64 within distributors 28. As is the case with pipe 62, each of the pipes 66 is of an internal diameter greater than the orifice defining lower edge of respective restrictor nozzles 44c and 44d so that air may enter the space between the inside surface of corresponding pipes 66 and the external, adjacent conical surface of restrictor nozzles 44c and 44d.

Each of the splash boxes 64 and 68, which as noted, are preferably of identical construction and operation, have a lower wall 70 which rests on the bottom of a respective distributor 28 or 30. A series of transverse, inverted U-shaped weir defining walls 72 extending between sidewalls 74 and 76 of splash boxes 64 and 68, define an elongated slot 78 therebetween which permits water to flow outwardly of corresponding boxes 64 and 68, into a respective distributor 28 and 30. Upright diverter posts 80 which project upwardly from lower wall 70 of each box 64 and 68, are in staggered relationship relative to one another so as to effectively divert water toward the dams presented by weir walls 72.

OPERATION OF THE PREFERRED EMBODIMENT

In operation, hot water to be cooled and which is supplied from a power plant steam condensing unit, or from a processing plant requiring removal of heat from hot water, is directed to a header pipe connected to the main supply lines 38 of respective cells of tower 10. Hot water introduced into main supply line 38 flows into and through the horizontal distribution tubes 40a, 40b, 42a and 42b, whereupon the water makes a right angle turn and flows downwardly through opening 54 of each of the restrictor nozzles 44a, 44b, 44c and 44d. Water is discharged through the orifice 60 of each of the restrictor nozzles 44a–d inclusive for delivering into corresponding pipes 62 and 66. Downflowing water in pipes 62 and 66 is received in corresponding splash boxes 64 and 68 where the water overflows weir walls 72 and is discharged through slots 78 into respective distributors 28 and 30.

Upon installation of distribution system 36, either as new construction, or as a replacement for splash type fill of an existing cooling tower, it is contemplated that the conical sidewall structure 46 of each of the distributor nozzles 44 will be cut along lines 58 which are the same distance from the end wall 82 that initially closes the wall structure. As a consequence, all of the orifices 60 of restrictor nozzles 44 will be of the same preselected diameter.

Upon mounting of restrictor nozzles 44a–d on corresponding distribution tubes 42a and 42b, in downwardly facing disposition as shown in the Figures of the drawings, all of the orifices 60 will therefore lie in a common horizontal plane.

In view of the conical configuration of the restrictor nozzles 44a–d, some back pressure is imposed on the water discharged from the restrictors, thus assuring that the flow of hot water from all of the restrictor nozzles is essentially the same. Furthermore, that flow is proportional to the flow of hot water in the main supply line 38 and will change in direct proportion to changes in the flow in the supply line.

Although in the preferred embodiment of the invention, the restrictor nozzles 44 are all mounted so that the discharge orifices 60 thereof are all in the same horizontal plane, the vertical positions relatively of such discharge openings may vary to a certain extent, but preferably are maintained within zones such that the orifices of the restrictors are all in horizontal planes that are within about 3 feet vertically of one another. If desired in this respect, in those instances where the discharge orifices 60 are not co-planar, or essentially co-planar in that they lie in a common horizontal plane, the conical wall structures 46 may be cut along different lines along the axis of the nozzle so that the discharge orifices 60 are of a proper size to assure flow of hot water therefrom, which is in proper proportion to all other restrictor nozzles 44, depending upon the elevation of a particular discharge orifice 60.

It is also important to note that sizing of the pipes 62 and 66 so as to leave an open area in surrounding relationship to each of the conical wall structures 46 of respective restrictor nozzles 44, permits sufficient air to enter each of the pipes 62 and 66 during operation of the tower 10 under all design water loadings, without creation of significant negative pressure on the hot water flowing from a corresponding restrictor orifice 60. Creation of negative pressure on the hot water flowing from each restrictor orifice 60 would tend to pull the water away from the nozzle orifice and upset the balance of flow through all o the restrictor orifices.

It is preferred that the area defined by the annular space between the opening at the top of each of the pipes 62 and 66, and the adjacent conical surface of wall structure 46 of the respective restrictor nozzle 44, is at least as great as the area of the orifice 60 of that nozzle. Better results are obtained when the open area surrounding each of the orifices 60 is at least about twice as great as the area of the orifice, with even better results being obtained over a wider flow range when the open area is at least about 2.5 times as great as the area of the orifice 60 therewithin, and best when the open area around the restrictor nozzle is at least about 3 times as great as the area of the respective orifice 60.

Although the tower 10 as illustrated in the drawings and described above embodies a downcomer pipe 62 associated with each of the restrictor nozzles 44a and 44b, it is to be understood that these downcomer pipes may be eliminated and the hot water may be discharged directly from the restrictor nozzles 44 into respective underlying distributors 28. Furthermore, although the downcomers 66 are shown as being essentially straight pipes, these conduits may if desired be of dog leg configuration if desired as for example shown in the above referenced '636 patent.

What is claimed is:

1. In a multi-level film fill water cooling tower having upper and lower film fill packs arranged one above the other, means for inducing flow of cooling air through respective fill packs, hot water distribution structure including upper and lower hot water distributors overlying the upper and lower fill packs respectively for delivering hot water across the top of each of the packs, and essentially horizontal main hot water supply means located at an elevation generally above both of the fill packs, a self-balancing hot water distribution system for directing hot water from the main supply means to respective distributors comprising:

a first and a second flow restrictor for the upper and lower hot water distributors respectively, each of said restrictors having a hot water delivery orifice, and a hot water receiving opening spaced from a corresponding delivery orifice, said orifices being sized to cause hot water delivered therefrom to be at a respective predetermined flow that is substantially proportional to the flow of hot water in the main supply line;

means for connecting the hot water supply means to the water receiving openings of each of the restrictors for directing hot water from the supply means to the restrictors to cause delivery of such hot water through a respective orifice, each of the restrictors being vented to the surrounding atmosphere to a sufficient extent to preclude creation of significant negative pressure on the hot water flowing from a corresponding restrictor, said first restrictor being functional to deliver hot water exiting from the orifice thereof to the upper distributor;

means for delivering hot water exiting from the orifice of the second restrictor to the lower hot water distributor, said restrictors being located such that the orifices thereof are in horizontal planes that are within about 3 feet vertically of one another.

2. A multi-level film fill water cooling tower as set forth in claim 1, wherein each of said restrictors includes wall structure defining the orifice of a respective restrictor and serving to present a nozzle.

3. A multi-level film fill water cooling tower as set forth in claim 2, wherein said wall structure of each of the nozzle defining restrictors is of generally conical configuration.

4. A multi-level film fill water cooling tower as set forth in claim 3, wherein the conical wall structure of each of the nozzle defining restrictors is of an effective length permitting transverse severing thereof intermediate the initial ends of such wall structure to permit formation of a hot water delivery orifice of preselected diameter.

5. A multi-level film fill water cooling tower as set forth in claim 2, wherein the opening of each restrictor is in generally co-axial relationship with the orifice thereof.

6. A multi-level film fill water cooling tower as set forth in claim 1, wherein said means for delivering hot water from the second restrictor includes an elongated tubular member extending from the second restrictor to said lower hot water distributor.

7. A multi-level film fill water cooling tower as set forth in claim 6, wherein said tubular member comprises an elongated pipe extending from the second restrictor to said lower distributor, the pipe being located in co-axial relationship with the orifice of said second restrictor.

8. A multi-level film fill water cooling tower as set forth in claim 7, wherein each of said restrictors includes wall structure defining the orifice of a respective restrictor and serving to present a nozzle, said pipe having an open end aligned with the nozzle of said second restrictor, the diameter of said open end of the pipe being greater than the diameter of the orifice of the second restrictor nozzle, the nozzles presented by said first and second restrictors being in communication with the surrounding atmosphere at the orifice of each nozzle.

9. A multi-level film fill water cooling tower as set forth in claim 8, wherein said wall structure of each of the nozzle defining restrictors is of generally conical configuration.

10. A multi-level film fill water cooling tower as set forth in claim 1, wherein is provided a tubular member extending from said first restrictor to the upper distributor for delivering hot water exiting from the orifice of the first restrictor to the upper distributor.

11. A multi-level film fill water cooling tower as set forth in claim 10, wherein said tubular member includes a pipe having an open end aligned with the nozzle of said first restrictor, the diameter of the orifice of the first restrictor, the nozzles presented by said first and second restrictors being in communication with the surrounding atmosphere at the orifice of each nozzle.

12. A multi-level film fill water cooling tower as set forth in claim 1, wherein said conduit means includes a main, generally horizontal hot water supply line, a transverse distribution tube for each restrictor respectively and extending from the supply line to the opening of a respective restrictor, said distribution tubes all lying in a common, generally horizontal plane.

13. A multi-level film fill water cooling tower as set forth in claim 12, wherein is provided a series of generally co-planar distribution tubes joined to and projecting away from the supply line in opposite directions therefrom.

14. A multi-level film fill water cooling tower as set forth in claim 1, wherein said conduit means includes a main, generally horizontal hot water supply line, a transverse distribution tube for each restrictor respectively and extending from the supply line to a respective restrictor, each of said restrictors being provided with a semi-circular saddle connected to a respective destruction tube in surrounding relationship to the hot water receiving opening of a respective restrictor, each of said distribution tubes being provided with an opening therein aligned with and directly communicating with the opening of a corresponding restrictor.

15. A multi-level film fill water cooling tower as set forth in claim 1, wherein said means for delivering hot water exiting from the orifice of the second restrictor to the lower hot water distributor includes an uprigth pipe, and an anti-splash box unit at the lower end of the pipe for assuring substantially uniform delivery of hot water from the lower end of the pipe into the lower distributor.

16. A multi-level film fill water cooling tower as set forth in claim 1, wherein is provided a pipe extending from said first restrictor to the upper distributor for delivering hot water exiting from the orifice of the first restrictor to the upper distributor, and anti-splash box unit at the lower end of said pipe for assuring substantially uniform delivery of hot water from the pipe into the upper distributor.

17. A multi-level film fill water cooling tower as set forth in claim 1, wherein each of the restrictors includes conical, nozzle defining wall structure, and cylindrical wall means joined to the wall structure of each restrictor and defining said water receiving opening thereof.

18. In a method of cooling hot water by subjecting such water to streams of induced flow cooling air passing through upper and lower film fill packs arranged one above the other, and wherein hot water to be cooled is supplied via an essentially horizontal means supply line to hot water distributors overlying each of the fill packs for delivering hot water across the top of each of the fill packs, the improved steps of directing a balanced supply of hot water from the supply line to respective distributors including:

directing water laterally from the supply line along paths which overlie respective hot water distributors;

changing the direction of flow of hot water from respective lateral extending paths, to downwardly extending, generally upright paths which terminate directly above respective hot water distributors; and allowing ambient air to enter the flow path of the hot water generally at the zone of each change of direction thereof downwardly toward a corresponding hot water distributor, each of said zones of change of direction of hot water downwardly toward respective hot water distributors lying in horizontal planes that are within about 3 feet vertically of one another.

19. A method of cooling water as set forth in claim 18, wherein is included the step of confining the downward flow of hot water from each of said zones of change of direction thereof, to a predetermined downward path of travel.

20. A method of cooling water as set forth in claim 18, wherein is included the step of maintaining the flow of hot water into the distributors substantially proportional at all times to the flow of hot water in the main supply line.

* * * * *